United States Patent
Chen et al.

(10) Patent No.: US 10,959,086 B2
(45) Date of Patent: Mar. 23, 2021

(54) MULTI-SIM MULTI-STANDBY SYSTEM, METHOD AND DEVICE, COMPUTER DEVICE, AND COMPUTER READABLE STORAGE MEDIUM

(71) Applicant: SHENZHEN UCLOUDLINK NEW TECHNOLOGY CO., LTD., Shenzhen (CN)

(72) Inventors: Jingbing Chen, Shenzhen (CN); Liang Wang, Shenzhen (CN); Zhihui Gong, Shenzhen (CN)

(73) Assignee: SHENZHEN UCLOUDLINK NEW TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/842,699

(22) Filed: Apr. 7, 2020

(65) Prior Publication Data

US 2020/0236531 A1 Jul. 23, 2020

Related U.S. Application Data (63) Continuation-in-part of application No. PCT/CN2019/079023, filed on Mar. 21, 2019.

(30) Foreign Application Priority Data

Mar. 22, 2018 (CN) .......................... 201810238442.8

(51) Int. Cl.
*H04M 3/42* (2006.01)
*H04M 3/00* (2006.01)
(Continued)

(52) U.S. Cl.
CPC ............. *H04W 8/183* (2013.01); *H04L 67/10* (2013.01); *H04W 8/205* (2013.01); *H04W 76/10* (2018.02); *H04W 88/06* (2013.01)

(58) Field of Classification Search
CPC ..... H04W 8/183; H04W 76/10; H04W 8/205; H04W 88/06; H04W 88/02; H04W 8/24; H04L 67/10; H04L 65/00
(Continued)

(56) References Cited

U.S. PATENT DOCUMENTS

| | | | |
|---|---|---|---|
| 2003/0211840 A1* | 11/2003 | Castrogiovanni | H04W 4/24 455/405 |
| 2004/0229601 A1* | 11/2004 | Zabawskyj | H04W 76/15 455/417 |
| 2015/0230070 A1* | 8/2015 | Kadiyala | H04W 4/16 455/417 |

FOREIGN PATENT DOCUMENTS

CN 108616869 A 10/2018

* cited by examiner

*Primary Examiner* — Mark G. Pannell
(74) *Attorney, Agent, or Firm* — Robert L. Stearns; Dickinson Wright PLLC (57) ABSTRACT

The present disclosure provides a multi-SIM multi-standby system, a multi-SIM multi-standby method and device. The multi-SIM multi-standby system includes: a SIM card management system including at least one SIM card and a modem device that uses the at least one SIM card according to a SIM card's identification; a communication terminal configured to transmit a SIM card using request to a server, where the SIM card using request carries the SIM card's identification; the server being configured to receive the SIM card using request and acquire a modem device identification of the modem device that uses the SIM card according to the SIM card's identification, and return the modem device identification to a communication terminal; and the communication terminal being configured to transmit a communication request to a corresponding modem device according to the modem device identification so as to realize communication services by means of the modem device.

13 Claims, 3 Drawing Sheets

(51) Int. Cl.
  *H04W 8/18* (2009.01)
  *H04W 76/10* (2018.01)
  *H04L 29/08* (2006.01)
  *H04W 8/20* (2009.01)
  *H04W 88/06* (2009.01)
(58) Field of Classification Search
  USPC .......................................................... 455/418
  See application file for complete search history.

MULTI-SIM MULTI-STANDBY SYSTEM, METHOD AND DEVICE, COMPUTER DEVICE, AND COMPUTER READABLE STORAGE MEDIUM

CROSS REFERENCE TO RELATED APPLICATION

This application is a continuation-in-part of PCT Patent Application Ser. No. PCT/CN2019/079023, filed on Mar. 21, 2019, which claims priority to Chinese Patent Application Ser. No. CN201810238442.8, filed on Mar. 22, 2018, the entire disclosures of which are incorporated herein by reference in their entireties.

TECHNICAL FIELD

The present disclosure belongs to the technical field of communications, and particularly relates to a multi-SIM multi-standby system, a multi-SIM multi-standby method, a multi-SIM multi-standby device, a computer device and a computer readable storage medium.

BACKGROUND

Terminals, such as mobile phones, have become an indispensable part in people's daily life, people usually communicates with others by means of a mobile phone; however, with the continuous development of people's social circles, a user often need to prepare many telephone numbers to separate a working telephone from a living telephone in order to avoid working from being mixed with living life.

Due to the fact that an existing communication terminal such as a mobile phone usually supports 2 physical SIM cards at the most, when the user needs to use communication functions of multiple physical SIM cards including voice and short message, these communication functions may only be implemented by replacing physical SIM card; in this case, the user may only use the communication function of the physical SIM card being plugged into the mobile phone, however, the unplugged physical SIM card may not be used to dial or receive an incoming call; moreover, when the user often needs for a business trip or needs to use different physical SIM cards under some other scenes, the SIM card needs to be replaced by frequent plugging in and drawing out the physical SIM card.

It is known from the above that, there is a technical problem in the prior art that the communication information of the physical SIM card which is not plugged into the communication terminal may not be received in real time, and the physical SIM card needs to be frequently plugged in and drawn out, so that user experience is influenced.

SUMMARY

One embodiment of the present disclosure provides a multi-SIM multi-standby system, which aims at solving a problem in the prior art that the communication information of the physical SIM card which is not plugged into the communication terminal may not be received in real time, and frequently plugging in and drawing out of the physical SIM card are necessary, so that user experience is influenced.

In the first aspect, the embodiments of the present disclosure are implemented in this way, a multi-SIM multi-standby system, including:

a SIM card management system, the SIM card management system includes a SIM card management device that may be plugged in with at least one SIM card, and a modem device that uses the SIM card plugged into the SIM card management device;

a communication terminal configured to transmit a SIM card using request to a server, where the SIM card using request carries the SIM card's identification;

the server being configured to receive the SIM card using request from the communication terminal and acquire a modem device identification of a modem device that uses the SIM card according to the SIM card's identification, and return the modem device identification to the communication terminal; and the communication terminal being configured to transmit a communication request to a corresponding modem device according to the modem device identification so as to realize communication service by means of the modem device.

In the second aspect, the embodiments of the present disclosure provide a multi-SIM multi-standby method being applied in a communication terminal, including:

transmitting a SIM card using request to the server by the communication terminal, where the SIM card using request carries the SIM card's identification;

receiving, by the communication terminal, a modem device identification of a modem device that uses the SIM card and acquired by the server according to the SIM card's identification; and transmitting, by the communication terminal, a communication request to a modem device according to the modem identification to realize communication service by means of the modem device.

In the third aspect, the embodiments of the present disclosure further provide a multi-SIM multi-standby method being applied in a server, including:

receiving, by the server, a SIM card using request sent by a communication terminal, where the SIM card using request carries the SIM card's identification; and acquiring a modem device identification of a modem device that uses the SIM card according to the SIM card's identification, and transmitting the modem device identification to the communication terminal by the server, in order that the communication terminal transmits a communication request to the modem device according to the modem device identification to realize communication service by means of the modem device.

In the fourth aspect, the embodiments of the present disclosure further provide a multi-SIM multi-standby method being applied to a communication terminal, including:

transmitting a SIM card using request to a server by the communication terminal, where the SIM card using request carries the SIM card's identification; and acquiring a modem device identification of a modem device that uses the SIM card according to the SIM card's identification and transmitting the modem device identification to the communication terminal by the server in order that the communication terminal transmits a communication request to the modem device according to the modem device identification so as to realize communication service by means of the modem device.

Embodiments of the present disclosure further provide a computer device including a processer configured to execute computer program stored in a memory so as to implement steps in the multi-SIM multi-standby method provided in the second aspect.

Embodiments of the present disclosure further provide a computer readable storage medium which stores computer program (instruction), wherein steps in the multi-SIM multi-standby method provided by the second aspect are implemented when the computer program (instruction) is executed by a processor.

In this embodiment of the present disclosure, the SIM card management system includes: a SIM card management device that may be plugged in with at least one SIM card and a modem device that uses the SIM card plugged into the SIM card management device; a communication terminal configured to transmit a SIM card using request to a server, where the SIM card using request carries the SIM card's identification; the server configured to receive the SIM card using request, and acquire the modem device identification of the modem device that uses the SIM card according to the SIM card's identification, and return the modem device identification to the communication terminal, so that the communication terminal transmits a communication request to the corresponding modem device according to the modem device identification so as to realize communication service by means of the modem device. In this way, picking up or dialing a phone call without plugging the SIM card into the communication terminal is realized, a multi-SIM multi-standby is realized, and missing of communication information received by the SIM card in the event that the SIM card is not plugged in may be avoided; furthermore, damage to the communication terminal due to repeatedly plugging in and drawing out of the SIM card in the event of replacement of the SIM card may be avoided; furthermore, the user need not to carry the SIM card at any time, so that a situation of losing of the SIM card may be avoided, and user experience is improved.

DESCRIPTION OF THE EMBODIMENTS

In order to make the purpose, the technical solution and the advantages of the present disclosure be clearer and more understandable, the present disclosure will be further described in detail below with reference to accompanying figures and embodiments. It should be understood that the specific embodiments described herein are merely intended to illustrate but not to limit the present disclosure.

In an embodiment of the present disclosure, multiple SIM (Subscriber Identity Module) cards are plugged into a SIM card management device, various SIM cards in the SIM card management device are allocated to different modem devices through configuration according to a user, the modem device is connected with the network, when an allocated SIM card receives communication information such as an incoming call or a short message, the modem device forwards the communication information to the user through voice communication technology, and when the user dials a phone number or sends short message, the modem device is used to call the corresponding SIM card to perform communication service. In this way, picking up or dialing a phone call without plugging the SIM card into the terminal is realized, multi-SIM multi-standby is achieved, and a situation that the communication information received by the SIM card is missed when the SIM card is not plugged into the communication terminal may be avoided; furthermore, damage to the communication terminal 200 caused to because that the SIM card is plugged in and drawn out by the user repeatedly when the SIM card is replaced may be avoided; furthermore, the user need not to carry the SIM card at any time, so that a situation of losing of the SIM card may be avoided, and user experience is improved.

Figure 1:
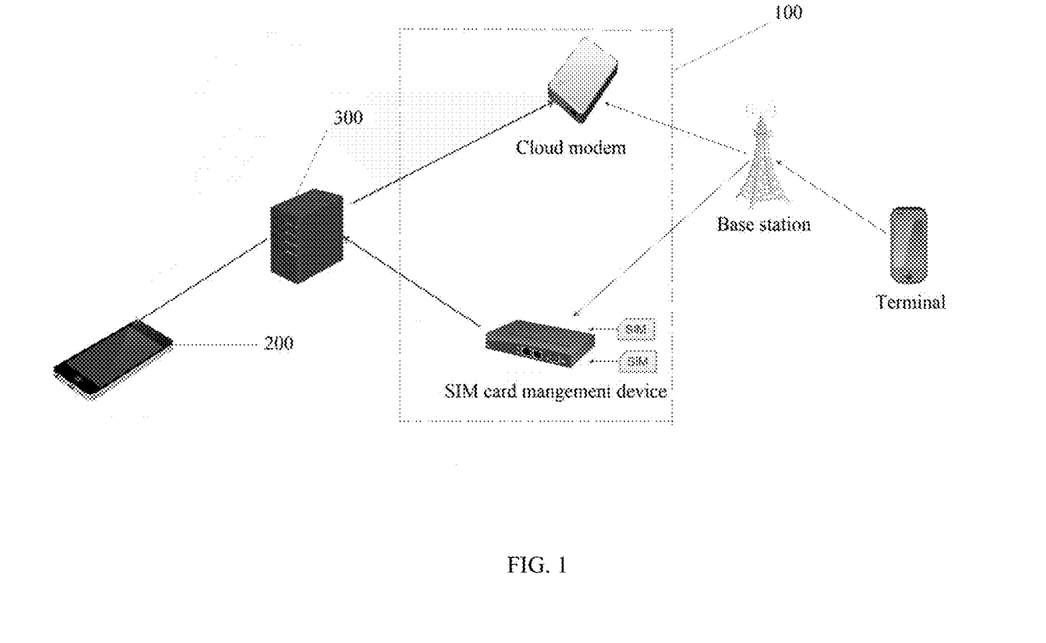
FIG. 1 is a schematic diagram of a multi-SIM multi-standby system constructed in accordance with an embodiment of the present disclosure.

FIG. 1 illustrates a diagram of implementation environment of a multi-SIM multi-standby system according to an embodiment of the present disclosure, which is described in detail below:

Referring to FIG. 1, a SIM card management system 100 includes a SIM card management device and a cloud modem device, a plurality of SIM cards are stored in the SIM card management device, and zero or more modem devices are arranged in the SIM card management device; the communication terminal 200 may transmit a configuration request of SIM card allocation state to the server 300 according to the requirement; the server 300 allocates the SIM card to the modem device arranged in the SIM card management device 100 and/or to the cloud modem device according to the configuration request. When the SIM card managed by the modem device receives communication information such as an incoming call or a short message sent by a normal mobile phone through a base station, the modem device forwards the communication information to the communication terminal 200 in order that the communication terminal 200 may pick up the incoming call or look up information like the SIM card that has been plugged into the communication terminal 200; moreover, the communication terminal 200 may also transmit a communication request to the corresponding modem device through voice communication technology according to the identification of the modem device provided by the server 300, when the SIM card managed by the modem device needs to be called to perform communication, for example, dialing is performed, the corresponding SIM card is called by the modem device to perform dialing through the base station according to the dialing request.

In this embodiment of the present disclosure, the modem device is a modem which is used as a device for performing digital-to-analog conversion.

In this embodiment of the present disclosure, the SIM card management device may connect to the server through the network such as Wi-Fi (Wireless Fidelity), network cable or GPRS (General Packet Radio Service), the cloud modem device may also connect to the server through the network such as Wi-Fi, network cable or GPRS. In particular, the way of connection may be set according to the actual condition, and it is not limited in the present disclosure.

Embodiment One

Figure 2:
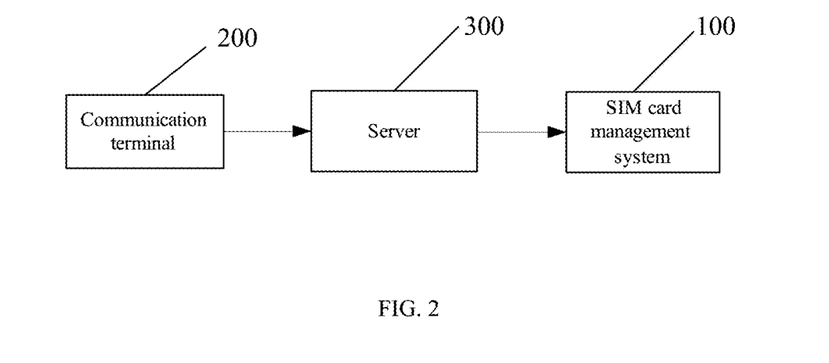
FIG. 2 is a schematic diagram of the multi-SIM multi-standby system in accordance with embodiment one of the present disclosure.

FIG. 2 illustrates a structure of multi-SIM multi-standby system provided by an embodiment of the present disclosure, for the convenience of description, the part related to the embodiment of the present disclosure is merely illustrated.

A SIM card management system 100, which includes a SIM card management device that may be plugged by at least one SIM card and a modem device that uses the SIM card plugged into the SIM card management device.

In this embodiment of the present disclosure, the SIM card management system includes the SIM card management device configured to store the SIM card, and the modem device configured to manage the SIM card, this SIM card management device may store SIM cards with different numbers according to the requirement of the user.

In this embodiment of the present disclosure, the SIM card includes but is not limited to E-SIM (Embedded Subscriber Identity Module) card, soft SIM card, cloud SIM card, and so on.

In this embodiment of the present disclosure, the modem device is a modem device arranged in the SIM card management device, and/or the modem device is a cloud modem device connected with a server. Where the cloud modem device is a modem device which may be deployed around the world and is configured to provide SIM card access service, even though the user is at other place or go abroad, the user may still use and receive communication information of other SIM cards such as incoming call, short message and the like in real time.

In this embodiment of the present disclosure, the SIM card management device may be connected to the server through the network such as Wi-Fi, network cable or GPRS (General Packet Radio Service), or the like, the cloud modem device may also be connected to the server through the network such as Wi-Fi, network cable or GPRS, or the like, in particular, the way of connection may be set according to the actual condition, it is not limited in the present disclosure.

A communication terminal 200, which is configured to transmit a SIM card using request, the SIM card using request carries the SIM card's identification.

In this embodiment of the present disclosure, the SIM card's identification is configured to uniquely identify the same SIM card, the identification of the SIM card may be a name or a number, etc., which includes but is not limited to one of a phone number, an ICCD (Integrated Circuit Card Identity), an IMSI (International Mobile Subscriber Identity Number), or a combination thereof.

In this embodiment of the present disclosure, the communication terminal may be a client, this client is an application program used for calling a SIM card stored in the SIM card management device to perform communication such as dialing or transmitting short message, etc, the client may be arranged in a device that may perform communication, such as a smart phone, a tablet computer, etc.

A server 300 is configured to receive the SIM card using request transmitted from the communication terminal 200 and acquire the modem device identification of the modem device that uses the SIM card according to the SIM card's identification, and return the modem device identification to the communication terminal 200.

In one embodiment of the present disclosure, a modem device may manage one or more SIM cards.

In this embodiment of the present disclosure, the modem device identification may be a VOIP (Voice Over Internet Protocol) account number, due to the fact that the modem device will forward the incoming call or the short message to the communication terminal 200 through VOIP technology in order that the user picks up the incoming call or receives the short message in time, when communication information such as incoming call or short message of the SIM card is received. Thus, the modem may be identified by the VOIP account number used by the modem.

The communication terminal 200 is further configured to transmit a communication request to a corresponding modem device according to the modem device identification so as to realize communication service by means of the modem device.

In this embodiment of the present disclosure, the communication terminal 200 may transmit the communication request such as dialing and transmitting short message to the corresponding modem device according to the modem device identification, after receiving the modem device identification as returned by the server 300. When the modem device acquires the communication request, the corresponding SIM card is called to perform corresponding communication service such as dialing or transmitting short message, and so on.

Furthermore, since one modem device may manage multiple SIM cards, in order to avoid communicating using a wrong SIM card, a called SIM card's identification may be sent at the time when the communication request is sent, so that the modem uses the corresponding SIM card to perform communication service according to the called SIM card's identification.

In this embodiment of the present disclosure, multiple SIM cards are plugged into the SIM card management device, various SIM cards in the SIM card management device are allocated to different modem devices according to configuration of the user, the modem device is connected with the network, the modem device forwards the communication information such as the incoming call or the short message to the user using voice communication technology when the communication information such as incoming call or short message or the like is received by the allocated SIM card; moreover, when the user dials a phone number or transmits a short message, the corresponding SIM card is called by the modem device to perform communication service. In this way, picking up or dialing a phone call without plugging the SIM card into the terminal is realized, multi-SIM multi-standby is achieved, and a situation that the communication information received by the SIM card is missed when the SIM card is not plugged into the communication terminal may be avoided; furthermore, damage to the communication terminal 200 caused to because that the SIM card is plugged in and drawn out by the user repeatedly when the SIM card is replaced may be avoided; furthermore, the user need not to carry the SIM card at any time, so that a situation of losing of the SIM card may be avoided, and user experience is improved.

Embodiment Two

FIG. 2 illustrates a configuration of a server 300 provided by an embodiment of the present disclosure, for the convenience of description, the part relevant to the embodiment of the present disclosure is merely illustrated.

The server 300 is configured to receive a SIM card configuration request sent by a communication terminal 200, where the SIM card configuration request carries the SIM card's identification and a SIM card configuration parameter.

In this embodiment of the present disclosure, the SIM card configuration parameter includes states of configuration of the SIM card. For example, each SIM card may be configured to be at least the following states, such as enabling voice service of the SIM card in the mode of SIM card management device, enabling voice service of the SIM card in the mode of cloud modem device, and/or enabling voice and/or data service of the SIM card in the mode of mobile phone. These states described above are merely illustrated by examples and may be set according to actual condition, the present disclosure is not limited thereto.

Where enabling voice service of the SIM card in the mode of SIM card management device is specifically: allocating the SIM card to the modem device arranged in the SIM card management device to enable the SIM card to access cellular network, so that the communication terminal may pick up and hang up the call directly as a local telephone, when a call or short message is received.

Where enabling voice service of the SIM card in a cloud modem device is specifically: allocating the SIM card to the cloud modem device to enable the SIM card to access the cellular network, the SIM card management device notifies the communication terminal through voice communication technology, when a call or a short message is received, the communication terminal may pick up and hang up the call directly as a local telephone. A specific application scenario of enabling the voice service of the SIM card in a cloud modem device mode is that: when modems arranged in the SIM card management device are insufficient or the current SIM card is a roaming SIM card at the place of the SIM card management device, at this time, the SIM card is allocated to the cloud modem device where the SIM card is located, and is used as the local SIM card to save roaming charge.

Where enabling the voice service of the SIM card in a mobile phone mode is specifically: allocating the SIM card to the communication terminal, so that the communication terminal may directly communicate according to voice and data service of the SIM card.

The aforesaid SIM card configuration method is described below according to specific application scenarios:

For example, 4 SIM cards are arranged on the SIM card management device by the user, the configuration of the SIM card is set by the user as follows:

SIM card 1: voice service of the SIM card is enabled in the mode of SIM card management device;

SIM card 2: voice service of the SIM card is enabled in the mode of cloud modem;

SIM card 3: voice service of this SIM card is enabled in the mode of cloud modem;

SIM card 4: voice and data service of the SIM card are enabled in the mode of mobile phone.

It is obvious from the above that, the user may directly use the voice and data service of the SIM card 4 through the mobile phone being provided with relevant services, and may also use voice services of the SIM card 1, the SIM card 2 and the SIM card 3 to realize simultaneous standby function of the 4 SIM cards; when the user goes abroad, and when the SIM card management device is located domestically, there is no need to pay roaming charge of using voice service of the SIM card 1 because that SIM card 1 is used domestically; when the SIM card is enabled in the mode of cloud modem, the cloud service may be preferentially allocated to the cloud modem in the country where the SIM card is located to enable the SIM card 2 and the SIM card 3 to be always charged according to the local pricing standard, regardless of where the SIM card management device is located.

As one embodiment of the present disclosure, a user may configure a SIM card to a corresponding modem device according to a SIM card configuration interface displayed on an APP of the communication terminal 200, the server 300 allocates the corresponding SIM card to the corresponding modem device when receiving the configuration parameter.

The server 300 is further configured to query whether the SIM card corresponding to the SIM card's identification is in an idle state according to the SIM card's identification.

In an embodiment of the present disclosure, the SIM card's identification includes but is not limited to one of a telephone number, an ICCD (Integrated Circuit Card Identity), an IMSI (International Mobile Subscriber Identity) number, or a combination thereof.

In this embodiment of the present disclosure, when receiving a SIM card configuration request sent by the communication terminal 200, whether the SIM card has already been in an allocated state is determined according to the SIM card's identification carried in the SIM card configuration request, if the SIM card has already been allocated, it indicates that the SIM card is in a non-idle state.

The server 300 is further configured to allocate the SIM card to the corresponding modem device according to the SIM card configuration parameter, when the SIM card is in an idle state.

In this embodiment of the present disclosure, when the SIM card is in an idle state, the SIM card corresponding to the SIM card's identification is allocated to the corresponding modem according to the SIM card configuration parameter sent by the user. For example, the SIM card is allocated to a local cloud modem device according to the home of the SIM card, when the SIM card configuration parameter is enabling voice communication service of the SIM card in the mode of cloud modem.

The server 300 is further configured to recover the SIM card, when the SIM card is in a non-idle state.

In this embodiment of the present disclosure, when the SIM card is determined as being in the non-idle state, the SIM card is recovered firstly, and then is allocated to the corresponding modem device to be used by the user according to SIM card allocation parameter.

In this embodiment of the present disclosure, according to the SIM card's identification and the SIM card configuration parameter sent by the user, the SIM card is configured according to the SIM card configuration parameter when the SIM card corresponding to the SIM card's identification is idle; moreover, the SIM card is recovered and reconfigured when the SIM card corresponding to the SIM card's identification is in the non-idle state, so that the user may use the corresponding SIM card according to his/her requirement by adopting different configuration methods, multi-card multi-standby may be realized, and user experience is improved.

A structure of a modem device is provided in embodiment three. In this embodiment of the present disclosure, the modem device may forward the communication data including the received short message information to the communication terminal so as to realize multi-card multi-standby; the modem device may also receive information of other SIM cards that are not plugged into the communication terminal 200 in real time, so that missing of important message and unnecessary trouble due to missing of important message are avoided; moreover, damage to the communication terminal 200 caused to because that the SIM card is plugged in and drawn out by the user repeatedly when the SIM card is replaced is also avoided; furthermore, the user need not to carry the SIM card at any time, so that a situation of losing of the SIM card may be avoided, and user experience is improved.

Example Four

Figure 3:
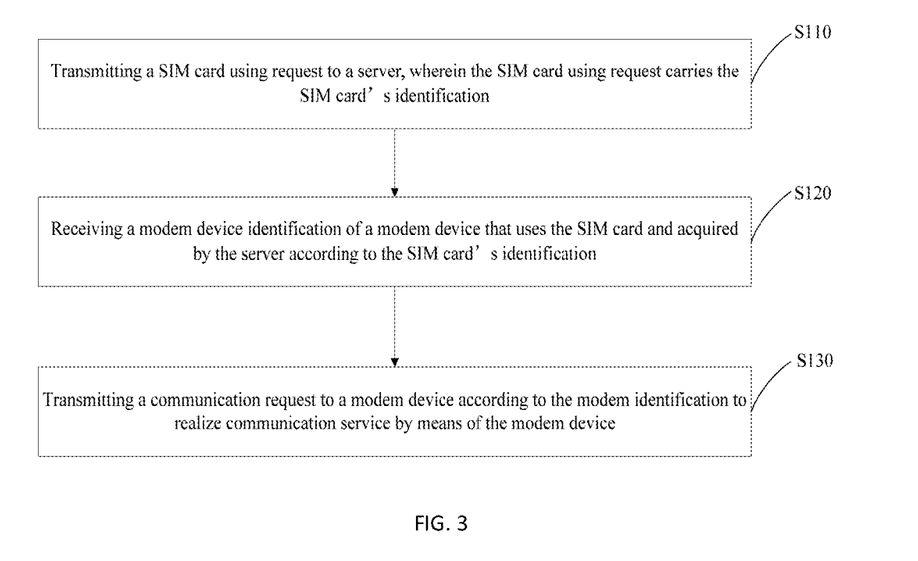
FIG. 3 is an implementation flow diagram of a multi-SIM multi-standby method in accordance with embodiment four of the present disclosure.

FIG. 3 illustrates an implementation flow diagram of multi-SIM multi-standby method provided by embodiment four of the present disclosure, which is applied to a communication terminal, and is described in detail as follows:

In step 110, transmitting a SIM card using request to a server, where the SIM card using request carries the SIM card's identification.

In this embodiment of the present disclosure, the SIM card's identification is used to uniquely identify the same SIM card, the SIM card's identification may be a name or a number, etc., and includes but is not limited to one of a telephone number, an ICCID (Integrated Circuit Card Identity), an IMSI (International Mobile Subscriber Identity) number, or a combination thereof.

In step S120, receiving a modem identification of a modem device that uses the SIM card and acquired by the server according to the SIM card identifier.

In this embodiment of the present disclosure, the modem device is a modem device arranged in the SIM card management device, and/or the modem device is a cloud modem device connected with a server. Where the cloud modem device is a modem device which may be deployed around the world and is configured to provide SIM card access service, even though the user is at other place or go abroad, the user may still use and receive communication information of other SIM cards such as incoming call, short message and the like in real time.

In this embodiment of the present disclosure, the SIM card management device may be connected to the server through the network such as Wi-Fi, network cable or GPRS (General Packet Radio Service), or the like, the cloud modem device may also be connected to the server through the network such as Wi-Fi, network cable or GPRS, or the like, in particular, the way of connection may be set according to the actual condition, it is not limited in the present disclosure.

In this embodiment of the present disclosure, one modem device may manage one or more SIM cards.

In this embodiment of the present disclosure, the modem device identification may be a VOIP (Voice Over Internet Protocol) account number, due to the fact that the modem device will forward the incoming call or the short message to the communication terminal 200 through VOIP technology in order that the user picks up the incoming call or receives the short message in time, when receiving communication information such as incoming call or short message of the SIM card. Thus, the modem may be identified by the VOIP account number used by the modem.

In step 130, transmitting a communication request to the modem device according to the modem identification to realize communication service by means of the modem device.

In this embodiment of the present disclosure, the communication terminal 200 may transmit the communication request such as dialing and transmitting short message to the corresponding modem device according to the modem device identification, after receiving the modem device identification as returned by the server 300. When receiving the dialing request, the modem device calls the corresponding SIM card to perform dialing so as to enable the user to use the SIM card which is not plugged into the communication terminal, thereby realizing multi-SIM multi-standby.

In this embodiment of the present disclosure, multiple SIM cards are plugged into the SIM card management device, various SIM cards in the SIM card management device are allocated to different modem devices according to configuration of the user, the modem device is connected with the network, the modem device forwards the communication information such as the incoming call or the short message to the user using voice communication technology, when the communication information such as incoming call or short message or the like is received by the allocated SIM card; moreover, when the user dials a phone number or transmits a short message, the corresponding SIM card is called by the modem device to perform communication service. In this way, picking up or dialing a phone call without plugging the SIM card into the terminal is realized, multi-SIM multi-standby is achieved, and a situation that the communication information received by the SIM card is missed when the SIM card is not plugged into the communication terminal may be avoided; furthermore, damage to the communication terminal caused to because that the SIM card is plugged in and drawn out by the user repeatedly when the SIM card is replaced may be avoided; furthermore, the user need not to carry the SIM card at any time, so that a situation of losing of the SIM card may be avoided, and user experience is improved.

Embodiment Five

Figure 4:
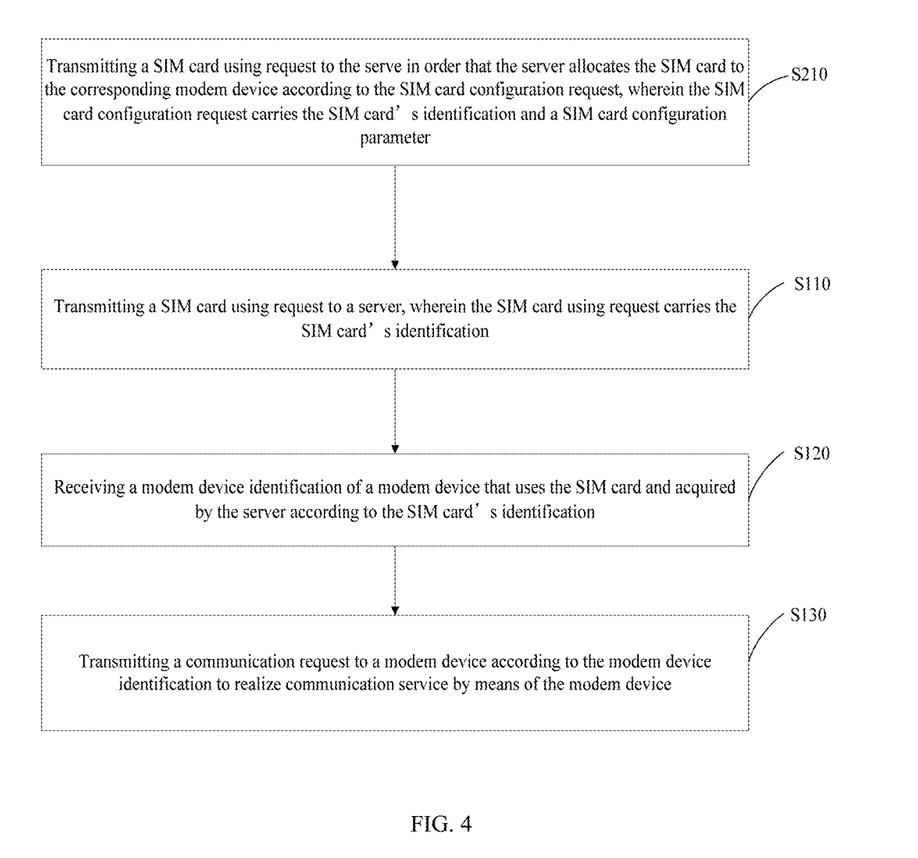
FIG. 4 is an implementation flow diagram of a multi-SIM multi-standby method in accordance with embodiment five of the present disclosure.

FIG. 4 illustrates an implementation flow diagram of a multi-SIM multi-standby method according to embodiment five of the present disclosure, embodiment five is similar to that of the embodiment four, what is different from embodiment four is that, before the step of transmitting a SIM card using request to the server 300, the multi-SIM multi standby method further includes:

in step 210, transmitting a SIM card configuration request to the server 300 in order that the server allocates the SIM card to a corresponding modem device according to the SIM card configuration parameter, where the SIM card configuration request carries the SIM card's identification and a SIM card configuration parameter.

In this embodiment of the present disclosure, the SIM card configuration parameter includes states of configuration of the SIM card. For example, each SIM card may be configured to be at least the following states such as enabling voice service of the SIM card in the mode of SIM card management device, enabling voice service of the SIM card in the mode of cloud modem device, and/or enabling voice and/or data service of the SIM card in the mode of mobile phone. These states described above are merely illustrated by examples and may be set according to actual condition, the present disclosure is not limited thereto.

Where enabling voice service of the SIM card in the mode of SIM card management device is specifically: allocating the SIM card to the modem device arranged in the SIM card management device to enable the SIM card to access cellular network, so that the communication terminal may pick up and hang up the call directly as a local telephone, when a call or short message is received.

Where enabling voice service of the SIM card in a cloud modem device is specifically: allocating the SIM card to the cloud modem device to enable the SIM card to access the cellular network; the SIM card management device notifies the communication terminal through voice communication technology, when a call or a short message is received, the communication terminal may pick up and hang up the call directly as a local telephone. A specific application scenario of enabling the voice service of the SIM card in a cloud modem device mode is that: when modems arranged in the SIM card management device are insufficient or the current SIM card is a roaming SIM card at the place of the SIM card management device, at this time, the SIM card is allocated to the cloud modem device where the SIM card is located, and is used as the local SIM card to save roaming charge.

Where enabling the voice service of the SIM card in a mobile phone mode is specifically: allocating the SIM card to the communication terminal, so that the communication terminal may directly communicate according to voice and data service of the SIM card.

In one application scenario of this embodiment of the present disclosure, a part or a whole of SIM cards such as SIM card 1, SIM card 2 and SIM card 3 may be displayed in the communication terminal that is previously equipped with called SIM cards, at this time, the user may configure the SIM card according to the requirement, such as allocating the SIM card 1 to the modem device arranged in the SIM card management device, and allocating the SIM card 2 and the SIM card 3 to the cloud modem device. In particular, a configuration list is displayed in the current display interface after the SIM card 1 is touched, the user may select to allocate the SIM card 1 to the corresponding modem device according to the configuration list, and report the configuration of SIM card 1 to the server 300 in order that the server 300 performs a corresponding configuration according to the configuration request.

In this embodiment of the present disclosure, by configuring the use state of the SIM card by the user, such that the user may manage and use different SIM cards according to his/her requirement, an unnecessary trouble due to random configuration of the SIM cards is avoided, the unnecessary trouble may be, such as the SIM card needs to be disposed on the cloud modem when the user needs to go on a business trip. However, due to the fact that the SIM card is randomly allocated to the modem device which is arranged in the SIM card management device, problems including occurrence of roaming charge are caused. Thus, by configuring the states of SIM cards according to the user, configuration of the SIM card may be performed according to user requirement, the level of user involvement is improved, and user experience is improved.

Embodiment Six

A multi-SIM multi-standby method is further provided in embodiment six, embodiment six is similar to embodiment one, what is different between them is that, the multi-SIM multi-standby method further includes:

receiving, when receiving an incoming call request, the incoming call request forwarded by the modem device, and picking up the incoming call according to the incoming call request; and receiving, when receiving a short message, the short message forwarded by the modem device, and displaying the short message.

In this embodiment of the present disclosure, the modem device and the communication terminal may realize transmission of voice data through VOIP (Voice Over Internet Protocol) technology, when the SIM card managed by the modem device picks up the incoming call request, the modem device will forward the incoming call request to the communication terminal, such as displaying the incoming call request on the communication terminal; a user may directly touch a picking-up button, at this moment, the modem device picks up the incoming call according to the picking-up instruction and transmits voice data of two parties in communication to the opposite party in real time to realize telephone call.

In this embodiment of the present disclosure, when the SIM card managed by the modem device receives a short message, the short message may be forwarded to the communication terminal through VOIP and is displayed on the display interface of the communication terminal, so that the user may look over the short message directly as a local terminal.

Furthermore, when there are too many SIM cards, in order to avoid the user from failing to determine which SIM card receives the incoming call or short message, when the modem device forwards the incoming call or short message to the communication terminal, an identification of a communication peer such as a telephone number, a name of the communication user, and the like may be displayed, so that the user may reply according to the telephone number of the corresponding SIM card.

Embodiment Seven

Figure 5:
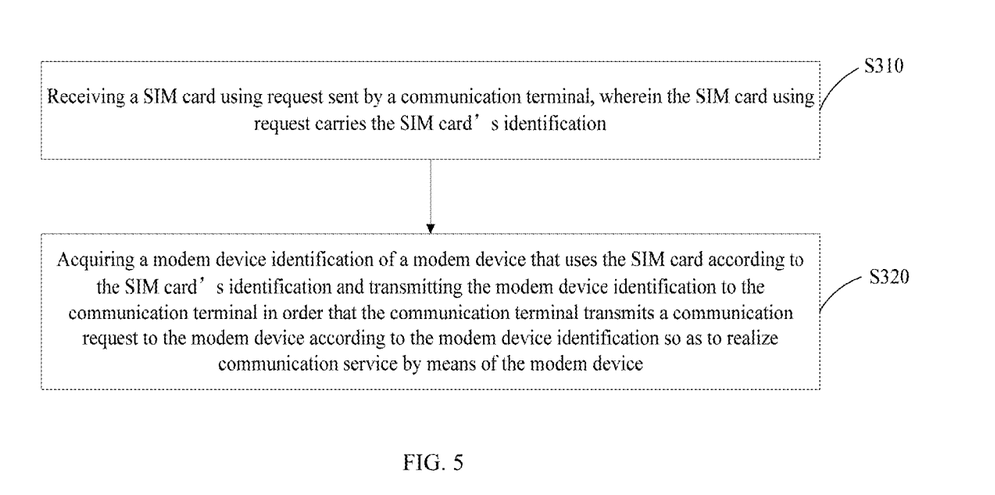
FIG. 5 is an implementation flow diagram of a multi-SIM multi-standby method in accordance with embodiment seven of the present disclosure.

FIG. 5 illustrates an implementation flow diagram of a multi-SIM multi-standby method provided by an embodiment of the present disclosure, the multi-SIM multi-standby method is applied in a server and is described in detail below:

in step 310, receiving a SIM card using request sent by a communication terminal, where the SIM card using request carries the SIM card's identification.

In this embodiment of the present disclosure, the SIM card's identification is used to uniquely identify the same SIM card, the SIM card's identification may be a name or a number, etc., and includes but is not limited to one of a telephone number, an ICCID (Integrated Circuit Card Identity), an IMSI (International Mobile Subscriber Identity) number, or a combination thereof.

In step S320, acquiring a modem device identification of a modem device that uses the SIM card according to the SIM card's identification and transmitting the modem device identification to the communication terminal so as to enable the communication terminal to transmit a communication request to the modem device according to the modem device identification, thereby realizing communication service by means of the modem device.

In this embodiment of the present disclosure, the modem device is a modem device arranged in the SIM card management device, and/or the modem device is a cloud modem device connected with a server. Where the cloud modem device is a modem device which may be deployed around the world and is configured to provide SIM card access service, even though the user is at other place or go abroad, the user may still use and receive communication information of other SIM cards such as incoming call, short message and the like in real time.

In this embodiment of the present disclosure, the SIM card management device is a device used for storing SIM cards, the SIM card management device may be connected to the server through the network such as Wi-Fi, network cable or GPRS (General Packet Radio Service), or the like, the cloud modem device may also be connected to the server through the network such as Wi-Fi, network cable or GPRS, or the like, in particular, the way of connection may be set according to the actual condition, it is not limited in the present disclosure.

In this embodiment of the present disclosure, one modem device may manage one or more SIM cards.

In this embodiment of the present disclosure, the modem device identification may be a VOIP (Voice Over Internet Protocol) account number, due to the fact that the modem device will forward the incoming call or the short message to the communication terminal 200 through VOIP technology in order that the user picks up the incoming call or receives the short message in time, when receiving communication information such as incoming call or short message of the SIM card. Thus, the modem may be identified by the VOIP account number used by the modem.

In this embodiment of the present disclosure, multiple SIM cards are plugged into the SIM card management device, various SIM cards in the SIM card management device are allocated to different modem devices according to configuration of the user, the modem device is connected with the network, the modem device forwards the communication information such as the incoming call or the short message to the user using voice communication technology when the communication information such as incoming call or short message or the like is received by the allocated SIM card; moreover, when the user dials a phone number or transmits a short message, the corresponding SIM card is called by the modem device to perform communication service. In this way, picking up or dialing a phone call without plugging the SIM card into the communication terminal is realized, multi-SIM multi-standby is achieved, and a situation that the communication information received by the SIM card is missed when the SIM card is not plugged into the communication terminal may be avoided; furthermore, damage to the communication terminal caused to because that the SIM card is plugged in and drawn out by the user repeatedly when the SIM card is replaced may be avoided; furthermore, the user need not to carry the SIM card at any time, so that a situation of losing of the SIM card may be avoided, and user experience is improved.

Embodiment Eight

Figure 6:
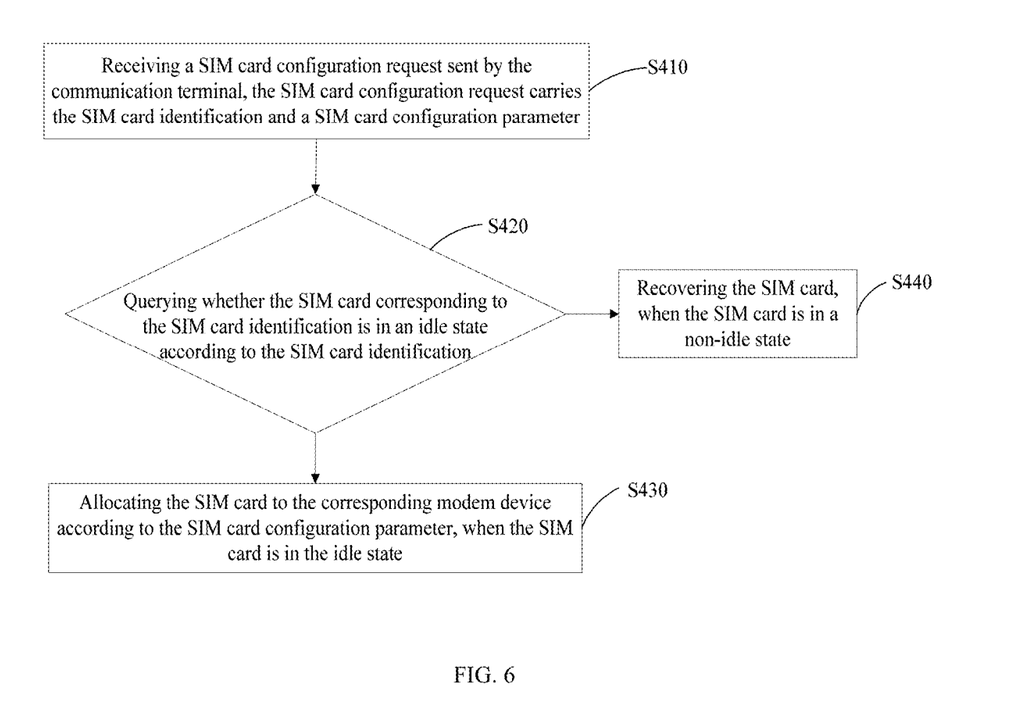
FIG. 6 is an implementation flow diagram of a SIM card configuration method in accordance with embodiment eight of the present disclosure.

FIG. 6 illustrates an implementation flow diagram of a SIM card configuration method provided by embodiment eight of the present disclosure, which is described in detail below:

In step 410, receiving a SIM card configuration request sent by the communication terminal, where the SIM card configuration request carries the SIM card's identification and a SIM card configuration parameter.

In this embodiment of the present disclosure, the SIM card configuration parameter includes states of configuration of the SIM card. For example, each SIM card may be configured to be at least the following states such as enabling voice service of the SIM card in the mode of SIM card management device, enabling voice service of the SIM card in the mode of cloud modem device, and/or enabling voice and/or data service of the SIM card in the mode of mobile phone. These states described above are merely illustrated by examples and may be set according to actual condition, the present disclosure is not limited thereto.

Where enabling voice service of the SIM card in the mode of SIM card management device is specifically: allocating the SIM card to the modem device arranged in the SIM card management device to enable the SIM card to access cellular network, so that the communication terminal may pick up and hang up the call directly as a local telephone, when a call or short message is received.

Where enabling voice service of the SIM card in a cloud modem device is specifically: allocating the SIM card to the cloud modem device to enable the SIM card to access the cellular network, the SIM card management device notifies the communication terminal through voice communication technology, when a call or a short message is received, the communication terminal may pick up and hang up the call directly as a local telephone. A specific application scenario of enabling the voice service of the SIM card in a cloud modem device mode is that: when modems arranged in the SIM card management device are insufficient or the current SIM card is a roaming SIM card at the place of the SIM card management device, at this time, the SIM card is allocated to the cloud modem device where the SIM card is located, and is used as the local SIM card to save roaming charge.

Where enabling the voice service of the SIM card in a mobile phone mode is specifically: allocating the SIM card to the communication terminal, so that the communication terminal may directly communicate according to voice and data service of the SIM card.

The aforesaid SIM card configuration method is described below according to specific application scenarios:

For example, 4 SIM cards are arranged on the SIM card management device by the user, the configuration of the SIM card is set by the user as follows:

SIM card 1: voice service of the SIM card is enabled in the mode of SIM card management device;

SIM card 2: voice service of the SIM card is enabled in the mode of cloud modem;

SIM card 3: voice service of this SIM card is enabled in the mode of cloud modem;

SIM card 4: voice and data service of the SIM card are enabled in the mode of mobile phone.

It is obvious from the above that, the user may directly use the voice and data service of the SIM card 4 through the mobile phone being provided with relevant services, and may also use voice services of the SIM card 1, the SIM card 2 and the SIM card 3 to realize simultaneous standby function of the 4 SIM cards; when the user goes abroad, and when the SIM card management device is located domestically, there is no need to pay roaming charge of using voice service of the SIM card 1 because that SIM card 1 is used domestically; when the SIM card is enabled in the mode of cloud modem, the cloud service may be preferentially allocated to the cloud modem in the country where the SIM card is located to enable the SIM card 2 and the SIM card 3 to be always charged according to the local pricing standard, regardless of where the SIM card management device is located.

As one embodiment of the present disclosure, a user may configure a SIM card to a corresponding modem device according to a SIM card configuration interface displayed on an APP of the communication terminal, the server allocates the corresponding SIM card to the corresponding modem device when receiving the configuration parameter.

In step 420, querying whether the SIM card corresponding to the SIM card's identification is in an idle state according to the SIM card's identification.

In this embodiment of the present disclosure, the SIM card's identification includes but is not limited to one of a telephone number, an ICCD (Integrated Circuit Card Identity), an IMSI (International Mobile Subscriber Identity) number, or a combination thereof.

In this embodiment of the present disclosure, when receiving a SIM card configuration request sent by the communication terminal, whether the SIM card has already been in an allocated state is determined according to the SIM card's identification carried in the SIM card configuration request, if the SIM card has already been allocated, it indicates that the SIM card is in a non-idle state.

In step 430, allocating the SIM card to the corresponding modem device according to the SIM card configuration parameter, when the SIM card is in an idle state.

In this embodiment of the present disclosure, when the SIM card is in an idle state, the SIM card corresponding to the SIM card's identification is allocated to the corresponding modem according to the SIM card configuration parameter sent by the user. For example, the SIM card is allocated to a local cloud modem device according to the home of the SIM card, when the SIM card configuration parameter is enabling voice communication service of the SIM card in the mode of cloud modem.

In step 440, recovering the SIM card, when the SIM card is in a non-idle state.

In this embodiment of the present disclosure, when the SIM card is determined as being in the non-idle state, the SIM card is recovered firstly, and then is allocated to the corresponding modem device to be used by the user according to SIM card allocation parameter.

In this embodiment of the present disclosure, according to the SIM card's identification and the SIM card configuration parameter sent by the user, the SIM card is configured according to the SIM card configuration parameter when the SIM card corresponding to the SIM card's identification is idle; moreover, the SIM card is recovered and reconfigured when the SIM card corresponding to the SIM card's identification is in the non-idle state, so that the user may use the corresponding SIM card according to his/her requirement by adopting different configuration methods, multi-card multi-standby may be realized, and user experience is improved.

The embodiments of the present disclosure further provides a computer device, the computer device includes a processor configured to execute computer program stored in a memory so as to implement steps in the multi-SIM multi-standby method provided by method embodiment four, the method embodiment five and the method embodiment six.

The embodiments of the present disclosure further provides a computer readable storage medium, computer readable storage medium stores computer program or computer instruction, when the computer program or the computer instruction is executed by the processor mentioned above, steps in the multi-SIM multi-standby method provided by method embodiment four, the method embodiment five and the method embodiment six are implemented.

Exemplarily, the computer program may be divided into one or a plurality of modules, the one or plurality of modules are stored in the memory and are executed by the processor so as to implement the present disclosure. The one or plurality of modules may be a series of computer program instruction segments that may accomplish particular functionalities, these instruction segments are used for describing an executive process of the computer program in the computer device.

It should be understood by the person of ordinary skill in the art that, the description of the aforesaid computer device is merely an example, and is not constituted as limitation to the computer device, more or less components may be included, or some components or different components may be combined; for example, an input and output device, a network access device, a bus, etc. may also be included.

The so called processor may be CPU (Central Processing Unit), and may also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor may be a microprocessor, alternatively, the processor may also be any conventional processor and so on. The processor is a control center of the computer device, every part of the whole user terminal is connected using various interfaces and circuits.

The memory may be used to store the computer programs and/or modules, the processor implements various functions of the computer device by performing or executing computer programs and/or modules stored in the memory and calling data stored in the memory. The memory may mainly include a program storage area and a data storage area, where the storage program region may store an operating system and at least one function desired application such as a sound playing function, an image playing function, etc.; the data storage area may store data (such as audio data, phone book, etc.) created according to the use of cell phone, etc. Furthermore, the memory may include high-speed RAM (Random Access Memory), and may also include non-volatile memory, such as a hard disk, a memory, a plug-in hard disk, a smart memory card (SMC), a secure digital (SD) card, a flash card, at least one magnetic disk storage device, a flash memory device, or other volatile solid-state storage device.

If the integrated module/unit of the computer device is achieved in the form of software functional units, and is sold or used as an independent product, it may be stored in a computer readable storage medium. Based on this understanding, a whole or part of flow process of implementing the method in the aforesaid embodiments of the present disclosure may also be accomplished by using computer program to instruct relevant hardware. When the computer program is executed by the processor, the steps in the various method embodiments described above may be implemented. Wherein, the computer program comprises computer program codes, which may be in the form of source code, object code, executable documents or some intermediate form, etc. The computer readable medium may include: any entity or device that may carry the computer program codes, recording medium, USB flash disk, mobile hard disk, hard disk, optical disk, computer storage device, ROM (Read-Only Memory), RAM (Random Access Memory), electrical carrier signal, telecommunication signal and software distribution medium, etc.

The aforementioned embodiments are only preferred embodiments of the present disclosure, and should not be regarded as limitation to the present disclosure. Any modification, equivalent replacement, improvement, and the like, which are made within the spirit and the principle of the present disclosure, should all be included in the protection scope of the present disclosure.

What is claimed is:

1. A multi-SIM multi-standby system, comprising:
    a SIM card management system, wherein the SIM card management system comprises a SIM card management device that may be plugged in with at least one SIM card, and a modem device that uses the SIM card plugged into the SIM card management device;
    a communication terminal configured to transmit a SIM card using request to a server, wherein the SIM card using request carries the SIM card's identification;
    the server being configured to receive the SIM card using request from the communication terminal and acquire a modem device identification of a modem device that uses the SIM card according to the SIM card's identification, and return the modem device identification to the communication terminal; and
    the communication terminal being configured to transmit a communication request to a corresponding modem device according to the modem device identification so as to realize communication service by means of the modem device.

2. The multi-SIM multi-standby system of claim 1, wherein the modem device is a modem device arranged in the SIM card management system, and/or the modem device is a cloud modem device connected with the server.

3. The multi-SIM multi-standby system of claim 1, wherein the server is further configured to:
   receive a SIM card configuration request sent by the communication terminal, where the SIM card configuration request carries the SIM card's identification and a SIM card configuration parameter;
   query whether the SIM card corresponding to the SIM card's identification is in an idle state according to the SIM card's identification; and
   allocate the SIM card to the corresponding modem device according to the SIM card configuration parameter, when the SIM card is in the idle state.

4. The multi-SIM multi-standby system according to claim 3, wherein the server is further configured to recover the SIM card, when the SIM card is in a non-idle state.

5. The multi-SIM multi-standby system according to claim 1, wherein the modem device is configured to forward an incoming call request to the communication terminal when receiving an incoming call request, and to receive a picking-up instruction sent by the communication terminal and pick up the incoming call according to the picking-up instruction.

6. A multi-SIM multi-standby method being applied in a communication terminal, comprising:
   transmitting a SIM card using request to the server by the communication terminal, wherein the SIM card using request carries the SIM card's identification;
   receiving, by the communication terminal, a modem device identification of a modem device that uses the SIM card and acquired by the server according to the SIM card's identification; and
   transmitting, by the communication terminal, a communication request to a modem device according to the modem device identification to realize communication service by means of the modem device.

7. The multi-SIM multi-standby method according to claim 6, wherein the modem device is a modem device arranged in a SIM card management system, and/or the modem device is a cloud modem device connected with the server.

8. The multi-SIM multi-standby method according to claim 6, wherein before the step of transmitting a SIM card using request to a server, further comprising:
   transmitting, by the communication terminal, a SIM card configuration request to the server in order that the server allocates the SIM card to the corresponding modem device according to the SIM card configuration request, wherein the SIM card configuration request carries the SIM card's identification and a SIM card configuration parameter.

9. The multi-SIM multi-standby method according to claim 6, further comprising:
   receiving, when receiving an incoming call request, the incoming call request forwarded by the modem device, and picking up the incoming call according to the incoming call request by the communication terminal; and
   receiving, when receiving a short message, the short message forwarded by the modem device, and displaying the short message by the communication terminal.

10. A multi-SIM multi-standby method being applied in a server, comprising:
    receiving, by the server, a SIM card using request sent by a communication terminal, wherein the SIM card using request carries the SIM card's identification; and
    acquiring a modem device identification of a modem device that uses the SIM card according to the SIM card's identification, and transmitting the modem device identification to the communication terminal by the server, in order that the communication terminal transmits a communication request to the modem device according to the modem device identification so as to realize communication service by means of the modem device.

11. The multi-SIM multi-standby method according to claim 10, wherein the modem device is a modem device arranged in a SIM card management system, and/or the modem device is a cloud modem device connected with the server.

12. The multi-SIM multi-standby method according to claim 10, before the step of receiving, by the server, the SIM card using request sent by the communication terminal, further comprising:
    receiving, by the server, a SIM card configuration request sent by the communication terminal, wherein the SIM card configuration request carries the SIM card's identification and a SIM card configuration parameter;
    querying whether the SIM card corresponding to the SIM card's identification is in an idle state according to the SIM card's identification by the server; and
    allocating the SIM card to the corresponding modem device according to the SIM card configuration parameter by the server, when the SIM card is in the idle state.

13. The multi-SIM multi-standby method according to claim 12, wherein after querying whether the SIM card corresponding to the SIM card's identification is in an idle state according to the SIM card's identification by the server, further comprising:
    recovering the SIM card by the server, when the SIM card is in a non-idle state.

* * * * *